US00RE48725E

(19) United States
(12) Reissued Patent
Majee et al.

(10) Patent Number: US RE48,725 E
(45) Date of Reissued Patent: Sep. 7, 2021

(54) METHODS FOR ACCESSING DATA IN A COMPRESSED FILE SYSTEM AND DEVICES THEREOF

(71) Applicants: Sumandra Majee, San Jose, CA (US); David Hansen, Seattle, WA (US)

(72) Inventors: Sumandra Majee, San Jose, CA (US); David Hansen, Seattle, WA (US)

(73) Assignee: F5 NETWORKS, INC., Seattle, WA (US)

(21) Appl. No.: 15/499,499

(22) Filed: Apr. 27, 2017

Related U.S. Patent Documents

Reissue of:
(64) Patent No.: 9,020,912
Issued: Apr. 28, 2015
Appl. No.: 13/400,202
Filed: Feb. 20, 2012

(51) Int. Cl.
*H04L 12/46* (2006.01)
*G06F 12/10* (2016.01)
*H04L 12/24* (2006.01)
*H04L 29/06* (2006.01)

(52) U.S. Cl.
CPC ..... *H04L 12/4675* (2013.01); *H04L 41/0233* (2013.01); *H04L 69/04* (2013.01)

(58) Field of Classification Search
CPC .. H04L 12/4675; H04L 41/0233; H04L 69/04
USPC ..... 707/693, 736; 380/28
See application file for complete search history.

(56) References Cited

U.S. PATENT DOCUMENTS 4,843,480 A 6/1989 Nishikawa et al.
4,993,030 A 2/1991 Krakauer et al.
5,218,695 A 6/1993 Noveck et al.
5,282,201 A 1/1994 Frank
5,303,368 A 4/1994 Kotaki
5,473,362 A 12/1995 Fitzgerald et al.
(Continued)

FOREIGN PATENT DOCUMENTS

AU 2003300350 A1 7/2004
CA 2080530 A1 4/1994
(Continued)

OTHER PUBLICATIONS

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

(Continued)

*Primary Examiner* — Joshua D Campbell
(74) *Attorney, Agent, or Firm* — Troutman Pepper Hamilton Sanders LLP (Rochester)

(57) ABSTRACT

A method, computer readable medium, and network traffic management apparatus that accesses data in a compressed file system includes obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

24 Claims, 3 Drawing Sheets

(56) References Cited

U.S. PATENT DOCUMENTS 5,511,177 A 4/1996 Kagimasa et al.
5,537,585 A 7/1996 Blickenstaff et al.
5,548,724 A 8/1996 Akizawa et al.
5,550,816 A 8/1996 Hardwick et al.
5,550,965 A 8/1996 Gabbe et al.
5,583,995 A 12/1996 Gardner et al.
5,586,260 A 12/1996 Hu
5,590,320 A 12/1996 Maxey
5,606,665 A 2/1997 Yang et al.
5,623,490 A 4/1997 Richter et al.
5,649,194 A 7/1997 Miller et al.
5,649,200 A 7/1997 Leblang et al.
5,668,943 A 9/1997 Attanasio et al.
5,692,180 A 11/1997 Lee
5,721,779 A 2/1998 Funk
5,724,512 A 3/1998 Winterbottom
5,806,061 A 9/1998 Chaudhuri et al.
5,832,496 A 11/1998 Anand et al.
5,832,522 A 11/1998 Blickenstaff et al.
5,838,970 A 11/1998 Thomas
5,862,325 A 1/1999 Reed et al.
5,884,303 A 3/1999 Brown
5,889,935 A 3/1999 Ofek et al.
5,893,086 A 4/1999 Schmuck et al.
5,897,638 A 4/1999 Lasser et al.
5,901,327 A 5/1999 Ofek
5,905,990 A 5/1999 Inglett
5,917,998 A 6/1999 Cabrera et al.
5,920,873 A 7/1999 Van Huben et al.
5,926,816 A 7/1999 Bauer et al.
5,937,406 A 8/1999 Balabine et al.
5,991,302 A 11/1999 Berl et al.
5,995,491 A 11/1999 Richter et al.
5,999,664 A 12/1999 Mahoney et al.
6,012,083 A 1/2000 Savitzky et al.
6,029,168 A 2/2000 Frey
6,029,175 A 2/2000 Chow et al.
6,041,365 A 3/2000 Kleinerman
6,044,367 A 3/2000 Wolff
6,044,444 A 3/2000 Ofek
6,047,129 A 4/2000 Frye
6,047,356 A 4/2000 Anderson et al.
6,067,558 A 5/2000 Wendt et al.
6,072,942 A 6/2000 Stockwell et al.
6,078,929 A 6/2000 Rao
6,085,234 A 7/2000 Pitts et al.
6,088,694 A 7/2000 Burns et al.
6,104,706 A 8/2000 Richter et al.
6,128,627 A 10/2000 Mattis et al.
6,128,717 A 10/2000 Harrison et al.
6,154,777 A 11/2000 Ebrahim
6,157,950 A 12/2000 Krishnan
6,161,145 A 12/2000 Bainbridge et al.
6,161,185 A 12/2000 Guthrie et al.
6,181,336 B1 1/2001 Chiu et al.
6,202,156 B1 3/2001 Kalajan
6,223,206 B1 4/2001 Dan et al.
6,233,648 B1 5/2001 Tomita
6,237,008 B1 5/2001 Beal et al.
6,256,031 B1 7/2001 Meijer et al.
6,259,405 B1 7/2001 Stewart et al.
6,260,070 B1 7/2001 Shah
6,282,610 B1 8/2001 Bergsten
6,289,345 B1 9/2001 Yasue
6,292,832 B1 9/2001 Shah et al.
6,304,913 B1 10/2001 Rune
6,308,162 B1 10/2001 Ouimet et al.
6,324,581 B1 11/2001 Xu et al.
6,329,985 B1 12/2001 Tamer et al.
6,330,574 B1 12/2001 Murashita
6,338,082 B1 1/2002 Schneider
6,339,785 B1 1/2002 Feigenbaum
6,349,343 B1 2/2002 Foody et al.
6,353,848 B1 3/2002 Morris
6,363,056 B1 3/2002 Beigi et al.
6,370,527 B1 4/2002 Singhal
6,370,543 B2 4/2002 Hoffert et al.
6,374,263 B1 4/2002 Bunger et al.
6,374,336 B1 4/2002 Peters et al.
6,389,433 B1 5/2002 Bolosky et al.
6,389,462 B1 5/2002 Cohen et al.
6,393,581 B1 5/2002 Friedman et al.
6,397,246 B1 5/2002 Wolfe
6,412,004 B1 6/2002 Chen et al.
6,438,595 B1 8/2002 Blumenau et al.
6,446,108 B1 9/2002 Rosenberg et al.
6,466,580 B1 10/2002 Leung
6,469,983 B2 10/2002 Narayana et al.
6,477,544 B1 11/2002 Bolosky et al.
6,487,561 B1 11/2002 Ofek et al.
6,493,804 B1 12/2002 Soltis et al.
6,513,061 B1 1/2003 Ebata et al.
6,514,085 B2 2/2003 Slattery et al.
6,516,350 B1 2/2003 Lumelsky et al.
6,516,351 B2 2/2003 Borr
6,542,909 B1 4/2003 Tamer et al.
6,542,936 B1 4/2003 Mayle et al.
6,549,916 B1 4/2003 Sedlar
6,553,352 B2 4/2003 Delurgio et al.
6,556,997 B1 4/2003 Levy
6,556,998 B1 4/2003 Mukherjee et al.
6,560,230 B1 5/2003 Li et al.
6,578,069 B1 6/2003 Hopmann et al.
6,601,101 B1 7/2003 Lee et al.
6,606,663 B1 8/2003 Liao et al.
6,612,490 B1 9/2003 Herrendoerfer et al.
6,615,267 B1 9/2003 Whalen et al.
6,631,422 B1 10/2003 Althaus et al.
6,654,346 B1 11/2003 Mahalingaiah et al.
6,697,871 B1 * 2/2004 Hansen ..... 709/234
6,701,415 B1 3/2004 Hendren, III
6,704,755 B2 3/2004 Midgley et al.
6,708,220 B1 3/2004 Olin
6,721,794 B2 4/2004 Taylor et al.
6,728,265 B1 4/2004 Yavatkar et al.
6,728,704 B2 4/2004 Mao et al.
6,738,357 B1 5/2004 Richter et al.
6,738,790 B1 5/2004 Klein et al.
6,742,035 B1 5/2004 Zayas et al.
6,744,776 B1 6/2004 Kalkunte et al.
6,748,420 B1 6/2004 Quatrano et al.
6,754,215 B1 6/2004 Arikawa et al.
6,754,699 B2 6/2004 Swildens et al.
6,757,706 B1 6/2004 Dong et al.
6,760,337 B1 7/2004 Snyder, II et al.
6,775,672 B2 8/2004 Mahalingam et al.
6,775,673 B2 8/2004 Mahalingam et al.
6,775,679 B2 8/2004 Gupta
6,782,450 B2 8/2004 Arnott et al.
6,795,860 B1 9/2004 Shah
6,801,960 B1 10/2004 Ericson et al.
6,826,613 B1 11/2004 Wang et al.
6,839,761 B2 1/2005 Kadyk et al.
6,847,959 B1 1/2005 Arrouye et al.
6,847,970 B2 1/2005 Keller et al.
6,850,997 B1 2/2005 Rooney et al.
6,857,009 B1 2/2005 Ferreria et al.
6,862,282 B1 3/2005 Oden
6,865,593 B1 3/2005 Reshef et al.
6,868,439 B2 3/2005 Basu et al.
6,868,447 B1 3/2005 Slaughter et al.
6,871,221 B1 3/2005 Styles
6,871,245 B2 3/2005 Bradley
6,880,017 B1 4/2005 Marce et al.
6,883,137 B1 4/2005 Girardot et al.
6,889,249 B2 5/2005 Miloushev et al.
6,904,040 B2 6/2005 Salapura et al.
6,914,881 B1 7/2005 Mansfield et al.
6,922,688 B1 7/2005 Frey, Jr.
6,928,518 B2 8/2005 Talagala
6,934,706 B1 8/2005 Mancuso et al.
6,938,039 B1 8/2005 Bober et al.
6,938,059 B2 8/2005 Tamer et al.
6,959,373 B2 10/2005 Testardi

(56) References Cited

U.S. PATENT DOCUMENTS 6,961,815 B2 11/2005 Kistler et al.
6,970,475 B1 11/2005 Fraser et al.
6,970,924 B1 11/2005 Chu et al.
6,973,455 B1 12/2005 Vahalia et al.
6,973,490 B1 12/2005 Robertson et al.
6,973,549 B1 12/2005 Testardi
6,975,592 B1 12/2005 Seddigh et al.
6,985,936 B2 1/2006 Agarwalla et al.
6,985,956 B2 1/2006 Luke et al.
6,986,015 B2 1/2006 Testardi
6,990,074 B2 1/2006 Wan et al.
6,990,114 B1 1/2006 Erimli et al.
6,990,547 B2 1/2006 Ulrich et al.
6,990,667 B2 1/2006 Ulrich et al.
6,996,841 B2 2/2006 Kadyk et al.
6,999,912 B2 2/2006 Loisey et al.
7,003,533 B2 2/2006 Noguchi et al.
7,003,564 B2 2/2006 Greuel et al.
7,006,502 B2 2/2006 Lin
7,006,981 B2 2/2006 Rose et al.
7,010,553 B2 3/2006 Chen et al.
7,013,379 B1 3/2006 Testardi
7,020,644 B2 3/2006 Jameson
7,020,669 B2 3/2006 McCann et al.
7,020,713 B1 3/2006 Shah et al.
7,023,974 B1 4/2006 Brannam et al.
7,024,427 B2 4/2006 Bobbitt et al.
7,035,212 B1 4/2006 Mittal et al.
7,039,061 B2 5/2006 Connor et al.
7,051,112 B2 5/2006 Dawson
7,054,998 B2 5/2006 Arnott et al.
7,055,010 B2 5/2006 Lin et al.
7,065,482 B2 6/2006 Shorey et al.
7,072,917 B2 7/2006 Wong et al.
7,075,924 B2 7/2006 Richter et al.
7,076,689 B2 7/2006 Atkinson
7,080,314 B1 7/2006 Garofalakis et al.
7,089,286 B1 8/2006 Malik
7,089,491 B2 8/2006 Feinberg et al.
7,111,115 B2 9/2006 Peters et al.
7,113,962 B1 9/2006 Kee et al.
7,113,996 B2 9/2006 Kronenberg
7,120,728 B2 10/2006 Krakirian et al.
7,120,746 B2 10/2006 Campbell et al.
7,127,556 B2 10/2006 Blumenau et al.
7,133,863 B2 11/2006 Teng et al.
7,133,967 B2 11/2006 Fujie et al.
7,143,146 B2 11/2006 Nakatani et al.
7,146,524 B2 12/2006 Patel et al.
7,152,184 B2 12/2006 Maeda et al.
7,155,466 B2 12/2006 Rodriguez et al.
7,161,904 B2 1/2007 Hussain et al.
7,165,095 B2 1/2007 Sim
7,167,821 B2 1/2007 Hardwick et al.
7,171,469 B2 1/2007 Ackaouy et al.
7,173,929 B1 2/2007 Testardi
7,181,523 B2 2/2007 Sim
7,191,163 B2 3/2007 Herrera et al.
7,194,579 B2 3/2007 Robinson et al.
7,197,615 B2 3/2007 Arakawa et al.
7,219,260 B1 5/2007 de Forest et al.
7,228,359 B1 6/2007 Monteiro
7,234,074 B2 6/2007 Cohn et al.
7,236,491 B2 6/2007 Tsao et al.
7,237,076 B2 6/2007 Nakano et al.
7,240,100 B1 7/2007 Wein et al.
7,243,089 B2 7/2007 Becker-Szendy et al.
7,243,094 B2 7/2007 Tabellion et al.
7,257,633 B2 8/2007 Masputra et al.
7,263,610 B2 8/2007 Parker et al.
7,269,168 B2 9/2007 Roy et al.
7,269,582 B2 9/2007 Winter et al.
7,272,613 B2 9/2007 Sim et al.
7,280,536 B2 10/2007 Testardi
7,284,150 B2 10/2007 Ma et al.
7,292,541 B1 11/2007 C S
7,293,097 B2 11/2007 Borr
7,293,099 B1 11/2007 Kalajan
7,293,133 B1 11/2007 Colgrove et al.
7,296,263 B1 11/2007 Jacob
7,299,250 B2 11/2007 Douceur et al.
7,308,475 B1 12/2007 Pruitt et al.
7,324,533 B1 1/2008 DeLiberato et al.
7,330,486 B2 2/2008 Ko et al.
7,340,571 B2 3/2008 Saze
7,343,398 B1 3/2008 Lownsbrough
7,346,664 B2 3/2008 Wong et al.
7,373,345 B2 5/2008 Carpentier et al.
7,373,438 B1 5/2008 Debergalis et al.
7,373,520 B1 5/2008 Borthakur et al.
7,383,288 B2 6/2008 Miloushev et al.
7,383,463 B2 6/2008 Hayden et al.
7,401,220 B2 7/2008 Bolosky et al.
7,406,484 B1 7/2008 Srinivasan et al.
7,409,440 B1 8/2008 Jacob
7,415,488 B1 8/2008 Muth et al.
7,415,608 B2 8/2008 Bolosky et al.
7,418,439 B2 8/2008 Wong
7,437,358 B2 10/2008 Arrouye et al.
7,440,982 B2 10/2008 Lu et al.
7,443,321 B1 * 10/2008 Kaufman ..... G06F 17/30312 341/106
7,457,982 B2 11/2008 Rajan
7,467,158 B2 12/2008 Marinescu
7,475,241 B2 1/2009 Patel et al.
7,477,796 B2 1/2009 Sasaki et al.
7,509,322 B2 3/2009 Miloushev et al.
7,512,673 B2 3/2009 Miloushev et al.
7,519,813 B1 4/2009 Cox et al.
7,555,608 B2 6/2009 Naik et al.
7,562,110 B2 7/2009 Miloushev et al.
7,571,168 B2 8/2009 Bahar et al.
7,574,433 B2 8/2009 Engel
7,577,723 B2 8/2009 Matsuda et al.
7,587,471 B2 9/2009 Yasuda et al.
7,590,747 B2 9/2009 Coates et al.
7,599,941 B2 10/2009 Bahar et al.
7,610,307 B2 10/2009 Havewala et al.
7,610,390 B2 10/2009 Yared et al.
7,624,109 B2 11/2009 Testardi
7,639,883 B2 12/2009 Gill
7,640,347 B1 12/2009 Sloat et al.
7,644,109 B2 1/2010 Manley et al.
7,653,699 B1 1/2010 Colgrove et al.
7,656,788 B2 2/2010 Ma et al.
7,680,836 B2 3/2010 Anderson et al.
7,684,423 B2 3/2010 Tripathi et al.
7,685,126 B2 3/2010 Patel et al.
7,685,177 B1 3/2010 Hagerstrom et al.
7,689,596 B2 3/2010 Tsunoda
7,694,082 B2 4/2010 Golding et al.
7,698,458 B1 4/2010 Liu et al.
7,711,771 B2 5/2010 Kirnos
7,725,763 B2 5/2010 Vertes et al.
7,734,603 B1 6/2010 McManis
7,739,540 B2 6/2010 Akutsu et al.
7,743,031 B1 6/2010 Cameron et al.
7,743,035 B2 6/2010 Chen et al.
7,752,294 B2 7/2010 Meyer et al.
7,769,711 B2 8/2010 Srinivasan et al.
7,788,335 B2 8/2010 Miloushev et al.
7,805,470 B2 9/2010 Armangau et al.
7,809,691 B1 10/2010 Karmarkar et al.
7,818,299 B1 10/2010 Federwisch et al.
7,822,839 B1 10/2010 Pruitt et al.
7,822,939 B1 10/2010 Veprinsky et al.
7,831,639 B1 11/2010 Panchbudhe et al.
7,849,112 B2 12/2010 Mane et al.
7,853,958 B2 12/2010 Mathew et al.
7,861,085 B1 12/2010 Case et al.
7,870,154 B2 1/2011 Shitomi et al.
7,877,511 B1 1/2011 Berger et al.
7,885,970 B2 2/2011 Lacapra
7,886,218 B2 2/2011 Watson

(56) References Cited

U.S. PATENT DOCUMENTS 7,895,653 B2 2/2011 Calo et al.
7,900,002 B2 3/2011 Lyon
7,903,554 B1 3/2011 Manur et al.
7,904,466 B1 3/2011 Valencia et al.
7,908,245 B2 3/2011 Nakano et al.
7,913,053 B1 3/2011 Newland
7,937,421 B2 5/2011 Mikesell et al.
7,953,085 B2 5/2011 Chang et al.
7,953,701 B2 5/2011 Okitsu et al.
7,958,222 B1 6/2011 Pruitt et al.
7,958,347 B1 6/2011 Ferguson
7,974,478 B2 * 7/2011 Bashyam ..... G06T 9/004 382/232
7,984,108 B2 7/2011 Landis et al.
7,984,500 B1 7/2011 Khanna et al.
8,005,953 B2 8/2011 Miloushev et al.
8,015,157 B2 9/2011 Kamei et al.
8,024,443 B1 9/2011 Jacob
8,037,528 B2 10/2011 Williams et al.
8,046,547 B1 10/2011 Chatterjee et al.
8,055,724 B2 11/2011 Amegadzie et al.
8,064,342 B2 11/2011 Badger
8,069,225 B2 11/2011 McCanne et al.
8,074,107 B2 12/2011 Sivasubramanian et al.
8,099,758 B2 1/2012 Schaefer et al.
8,103,622 B1 1/2012 Karinta
8,112,392 B1 2/2012 Bunnell et al.
8,117,244 B2 2/2012 Marinov et al.
8,151,082 B2 * 4/2012 Flynn ..... G06F 3/0613 711/202
8,155,128 B2 4/2012 Balyan et al.
8,161,353 B2 * 4/2012 Flynn ..... G06F 17/30949 714/53
8,171,124 B2 5/2012 Kondamuru
8,209,403 B2 6/2012 Szabo et al.
8,271,620 B2 9/2012 Witchey
8,271,751 B2 9/2012 Hinrichs, Jr.
8,306,948 B2 11/2012 Chou et al.
8,326,798 B1 12/2012 Driscoll et al.
8,351,600 B2 * 1/2013 Resch ..... 380/28
8,396,836 B1 3/2013 Ferguson et al.
8,417,746 B1 4/2013 Gillett, Jr. et al.
8,463,850 B1 6/2013 McCann
8,468,542 B2 6/2013 Jacobson et al.
8,484,348 B2 7/2013 Subramanian et al.
8,498,951 B1 7/2013 Baluja et al.
8,572,007 B1 10/2013 Manadhata et al.
8,576,283 B1 11/2013 Foster et al.
8,595,547 B1 11/2013 Sivasubramanian et al.
8,601,000 B1 12/2013 Stefani et al.
8,620,879 B2 12/2013 Cairns
8,635,194 B2 * 1/2014 Pandey ..... H03M 7/30 386/328
8,645,337 B2 * 2/2014 Kapoor ..... G06F 17/30501 707/693
8,676,753 B2 3/2014 Sivasubramanian et al.
8,745,266 B2 6/2014 Agarwal et al.
8,745,338 B1 * 6/2014 Yadav ..... G06F 17/30153 707/693
8,838,817 B1 9/2014 Biswas
8,879,431 B2 11/2014 Ridel et al.
8,959,215 B2 2/2015 Koponen et al.
9,143,451 B2 9/2015 Amdahl et al.
2001/0007560 A1 7/2001 Masuda et al.
2001/0014891 A1 8/2001 Hoffert et al.
2001/0047293 A1 11/2001 Waller et al.
2001/0051955 A1 12/2001 Wong
2002/0010757 A1 1/2002 Granik et al.
2002/0012352 A1 1/2002 Hansson et al.
2002/0012382 A1 1/2002 Schilling
2002/0032758 A1 3/2002 Yen et al.
2002/0035537 A1 3/2002 Waller et al.
2002/0038360 A1 3/2002 Andrews et al.
2002/0059263 A1 5/2002 Shima et al.
2002/0065810 A1 5/2002 Bradley
2002/0065848 A1 5/2002 Walker et al.
2002/0072048 A1 6/2002 Slattery et al.
2002/0073105 A1 6/2002 Noguchi et al.
2002/0083118 A1 6/2002 Sim
2002/0087571 A1 7/2002 Stapel et al.
2002/0087744 A1 7/2002 Kitchin
2002/0087887 A1 7/2002 Busam et al.
2002/0099829 A1 7/2002 Richards et al.
2002/0099842 A1 7/2002 Jennings et al.
2002/0103823 A1 8/2002 Jackson et al.
2002/0106263 A1 8/2002 Winker
2002/0120763 A1 8/2002 Miloushev et al.
2002/0133330 A1 9/2002 Loisey et al.
2002/0133491 A1 9/2002 Sim et al.
2002/0143819 A1 10/2002 Han et al.
2002/0143852 A1 10/2002 Guo et al.
2002/0143909 A1 10/2002 Botz et al.
2002/0147630 A1 10/2002 Rose et al.
2002/0150253 A1 10/2002 Brezak et al.
2002/0156905 A1 10/2002 Weissman
2002/0161911 A1 10/2002 Pinckney, III et al.
2002/0162118 A1 10/2002 Levy et al.
2002/0174216 A1 11/2002 Shorey et al.
2002/0178410 A1 11/2002 Haitsma et al.
2002/0188667 A1 12/2002 Kirnos
2002/0194112 A1 12/2002 DePinto et al.
2002/0194342 A1 12/2002 Lu et al.
2002/0198956 A1 12/2002 Dunshea et al.
2003/0005172 A1 1/2003 Chessell
2003/0009429 A1 1/2003 Jameson
2003/0009528 A1 1/2003 Sharif et al.
2003/0012382 A1 1/2003 Ferchichi et al.
2003/0018450 A1 1/2003 Carley
2003/0018585 A1 1/2003 Butler et al.
2003/0022723 A1 1/2003 Johnston
2003/0028514 A1 2/2003 Lord et al.
2003/0033308 A1 2/2003 Patel et al.
2003/0033535 A1 2/2003 Fisher et al.
2003/0034905 A1 2/2003 Anton et al.
2003/0051045 A1 3/2003 Connor
2003/0055723 A1 3/2003 English
2003/0061240 A1 3/2003 McCann et al.
2003/0065956 A1 4/2003 Belapurkar et al.
2003/0074301 A1 4/2003 Solomon
2003/0105846 A1 6/2003 Zhao et al.
2003/0108000 A1 6/2003 Chaney et al.
2003/0108002 A1 6/2003 Chaney et al.
2003/0115218 A1 6/2003 Bobbitt et al.
2003/0115439 A1 6/2003 Mahalingam et al.
2003/0128708 A1 7/2003 Inoue et al.
2003/0130945 A1 7/2003 Force et al.
2003/0139934 A1 7/2003 Mandera
2003/0140210 A1 7/2003 Testardi
2003/0149781 A1 8/2003 Yared et al.
2003/0156586 A1 8/2003 Lee et al.
2003/0159072 A1 8/2003 Bellinger et al.
2003/0171978 A1 9/2003 Jenkins et al.
2003/0177364 A1 9/2003 Walsh et al.
2003/0177388 A1 9/2003 Botz et al.
2003/0179755 A1 9/2003 Fraser
2003/0189936 A1 10/2003 Terrell et al.
2003/0191812 A1 10/2003 Agarwalla et al.
2003/0195813 A1 10/2003 Pallister et al.
2003/0195962 A1 10/2003 Kikuchi et al.
2003/0200207 A1 10/2003 Dickinson
2003/0204635 A1 10/2003 Ko et al.
2003/0212954 A1 11/2003 Patrudu
2003/0220835 A1 11/2003 Barnes, Jr.
2003/0229665 A1 12/2003 Ryman
2003/0236995 A1 12/2003 Fretwell, Jr.
2004/0003266 A1 1/2004 Moshir et al.
2004/0006575 A1 1/2004 Visharam et al.
2004/0006591 A1 1/2004 Matsui et al.
2004/0010654 A1 1/2004 Yasuda et al.
2004/0015347 A1 1/2004 Mee
2004/0015783 A1 1/2004 Lennon et al.
2004/0017825 A1 1/2004 Stanwood et al.
2004/0025013 A1 2/2004 Parker et al.

(56) References Cited

U.S. PATENT DOCUMENTS

2004/0028043 A1 2/2004 Maveli et al.
2004/0028063 A1 2/2004 Roy et al.
2004/0030627 A1 2/2004 Sedukhin
2004/0030740 A1 2/2004 Stelting
2004/0030857 A1 2/2004 Krakirian et al.
2004/0043758 A1 3/2004 Sorvari et al.
2004/0044705 A1 3/2004 Stager et al.
2004/0054748 A1 3/2004 Ackaouy et al.
2004/0054777 A1 3/2004 Ackaouy et al.
2004/0059789 A1 3/2004 Shum
2004/0064544 A1 4/2004 Barsness et al.
2004/0064554 A1 4/2004 Kuno et al.
2004/0093361 A1 5/2004 Therrien et al.
2004/0093474 A1 5/2004 Lin et al.
2004/0098383 A1 5/2004 Tabellion et al.
2004/0098595 A1 5/2004 Aupperle et al.
2004/0122926 A1 6/2004 Moore et al.
2004/0123277 A1 6/2004 Schrader et al.
2004/0133577 A1 7/2004 Miloushev et al.
2004/0133605 A1 7/2004 Chang et al.
2004/0133606 A1 7/2004 Miloushev et al.
2004/0138858 A1 7/2004 Carley
2004/0139355 A1 7/2004 Axel et al.
2004/0148380 A1 7/2004 Meyer et al.
2004/0153479 A1 8/2004 Mikesell et al.
2004/0167967 A1 8/2004 Bastian et al.
2004/0177165 A1 9/2004 Masputra et al.
2004/0181605 A1 9/2004 Nakatani et al.
2004/0199547 A1 10/2004 Winter et al.
2004/0213156 A1 10/2004 Smallwood et al.
2004/0215665 A1 10/2004 Edgar et al.
2004/0236798 A1 11/2004 Srinivasan et al.
2004/0236826 A1 11/2004 Harville et al.
2004/0250032 A1 12/2004 Ji et al.
2005/0008017 A1 1/2005 Dana et al.
2005/0021615 A1 1/2005 Arnott et al.
2005/0021703 A1 1/2005 Cherry et al.
2005/0027841 A1 2/2005 Rolfe
2005/0027862 A1 2/2005 Nguyen et al.
2005/0044158 A1 2/2005 Malik
2005/0050107 A1 3/2005 Mane et al.
2005/0071589 A1 3/2005 Tross et al.
2005/0091214 A1 4/2005 Probert et al.
2005/0108575 A1 5/2005 Yung
2005/0114291 A1 5/2005 Becker-Szendy et al.
2005/0114701 A1 5/2005 Atkins et al.
2005/0117589 A1 6/2005 Douady et al.
2005/0160161 A1 7/2005 Barrett et al.
2005/0160243 A1 7/2005 Lubbers et al.
2005/0165656 A1 7/2005 Fredrick et al.
2005/0174944 A1 8/2005 Legault et al.
2005/0175013 A1 8/2005 Le Pennec et al.
2005/0187866 A1 8/2005 Lee
2005/0193245 A1 9/2005 Hayden et al.
2005/0198234 A1 9/2005 Leib et al.
2005/0198501 A1 9/2005 Andreev et al.
2005/0213587 A1 9/2005 Cho et al.
2005/0234928 A1 10/2005 Shkvarchuk et al.
2005/0240664 A1 10/2005 Chen et al.
2005/0246393 A1 11/2005 Coates et al.
2005/0256806 A1 11/2005 Tien et al.
2005/0273456 A1 12/2005 Revanuru et al.
2005/0289109 A1 12/2005 Arrouye et al.
2005/0289111 A1 12/2005 Tribble et al.
2006/0010502 A1 1/2006 Mimatsu et al.
2006/0031374 A1 2/2006 Lu et al.
2006/0031778 A1 2/2006 Goodwin et al.
2006/0045089 A1 3/2006 Bacher et al.
2006/0045096 A1 3/2006 Farmer et al.
2006/0047785 A1 3/2006 Wang et al.
2006/0074922 A1 4/2006 Nishimura
2006/0075475 A1 4/2006 Boulos et al.
2006/0080353 A1 4/2006 Miloushev et al.
2006/0100752 A1 5/2006 Kim et al.
2006/0106882 A1 5/2006 Douceur et al.
2006/0112151 A1 5/2006 Manley et al.
2006/0112367 A1 5/2006 Harris
2006/0112399 A1 5/2006 Lessly
2006/0123062 A1 6/2006 Bobbitt et al.
2006/0123210 A1 6/2006 Pritchett et al.
2006/0130133 A1 6/2006 Andreev et al.
2006/0133374 A1 6/2006 Sekiguchi
2006/0140193 A1 6/2006 Kakani et al.
2006/0153201 A1 7/2006 Hepper et al.
2006/0167838 A1 7/2006 Lacapra
2006/0179261 A1 8/2006 Rajan
2006/0184589 A1 8/2006 Lees et al.
2006/0190496 A1 8/2006 Tsunoda
2006/0200470 A1 9/2006 Lacapra et al.
2006/0206547 A1* 9/2006 Kulkarni et al. ..... 707/205
2006/0209669 A1 9/2006 Nishio
2006/0212746 A1 9/2006 Amegadzie et al.
2006/0218135 A1 9/2006 Bisson et al.
2006/0224636 A1 10/2006 Kathuria et al.
2006/0224687 A1 10/2006 Popkin et al.
2006/0229861 A1 10/2006 Tatsuoka et al.
2006/0230014 A1* 10/2006 Kedem ..... G06F 3/0605
2006/0230265 A1 10/2006 Krishna
2006/0235998 A1 10/2006 Stecher et al.
2006/0242179 A1 10/2006 Chen et al.
2006/0259320 A1 11/2006 LaSalle et al.
2006/0259949 A1 11/2006 Schaefer et al.
2006/0268692 A1 11/2006 Wright et al.
2006/0270341 A1 11/2006 Kim et al.
2006/0271598 A1 11/2006 Wong et al.
2006/0277225 A1 12/2006 Mark et al.
2006/0282442 A1 12/2006 Lennon et al.
2006/0282461 A1 12/2006 Marinescu
2006/0282471 A1 12/2006 Mark et al.
2006/0294164 A1 12/2006 Armangau et al.
2007/0005807 A1 1/2007 Wong
2007/0016613 A1 1/2007 Foresti et al.
2007/0016754 A1 1/2007 Testardi
2007/0019636 A1 1/2007 Lau et al.
2007/0024919 A1 2/2007 Wong et al.
2007/0027929 A1 2/2007 Whelan
2007/0027935 A1 2/2007 Haselton et al.
2007/0028068 A1 2/2007 Golding et al.
2007/0038994 A1 2/2007 Davis et al.
2007/0061441 A1 3/2007 Landis et al.
2007/0067771 A1 3/2007 Kulbak et al.
2007/0088702 A1 4/2007 Fridella et al.
2007/0112775 A1 5/2007 Ackerman
2007/0124415 A1 5/2007 Lev-Ran et al.
2007/0124502 A1 5/2007 Li
2007/0130255 A1 6/2007 Wolovitz et al.
2007/0136308 A1 6/2007 Tsirigotis et al.
2007/0139227 A1* 6/2007 Speirs et al. ..... 341/50
2007/0147246 A1 6/2007 Hurley et al.
2007/0162891 A1 7/2007 Burner et al.
2007/0168320 A1 7/2007 Borthakur et al.
2007/0168525 A1 7/2007 Deleon et al.
2007/0180314 A1 8/2007 Kawashima et al.
2007/0192543 A1 8/2007 Naik et al.
2007/0208748 A1 9/2007 Li
2007/0209075 A1 9/2007 Coffman
2007/0226331 A1 9/2007 Srinivasan et al.
2007/0233826 A1 10/2007 Tindal et al.
2007/0239944 A1 10/2007 Rupanagunta et al.
2007/0250560 A1 10/2007 Wein et al.
2007/0260830 A1 11/2007 Faibish et al.
2008/0004022 A1 1/2008 Johannesson et al.
2008/0010372 A1 1/2008 Khedouri et al.
2008/0022059 A1 1/2008 Zimmerer et al.
2008/0046432 A1 2/2008 Anderson et al.
2008/0070575 A1 3/2008 Claussen et al.
2008/0104347 A1 5/2008 Iwamura et al.
2008/0104443 A1 5/2008 Akutsu et al.
2008/0114718 A1 5/2008 Anderson et al.
2008/0120592 A1 5/2008 Tanguay et al.
2008/0141246 A1 6/2008 Kuck et al.
2008/0189468 A1 8/2008 Schmidt et al.
2008/0200207 A1 8/2008 Donahue et al.
2008/0208917 A1 8/2008 Smoot et al.

(56) References Cited

U.S. PATENT DOCUMENTS

2008/0208933 A1 8/2008 Lyon
2008/0209073 A1 8/2008 Tang
2008/0215836 A1 9/2008 Sutoh et al.
2008/0222223 A1 9/2008 Srinivasan et al.
2008/0243769 A1 10/2008 Arbour et al.
2008/0263401 A1 10/2008 Stenzel
2008/0270578 A1 10/2008 Zhang et al.
2008/0281908 A1 11/2008 McCanne et al.
2008/0281944 A1 11/2008 Vorne et al.
2008/0282047 A1 11/2008 Arakawa et al.
2008/0294446 A1* 11/2008 Guo et al. ..... 704/501
2009/0007162 A1 1/2009 Sheehan
2009/0013138 A1 1/2009 Sudhakar
2009/0019535 A1 1/2009 Mishra et al.
2009/0037500 A1* 2/2009 Kirshenbaum ..... 707/206
2009/0037975 A1 2/2009 Ishikawa et al.
2009/0041230 A1 2/2009 Williams
2009/0055507 A1 2/2009 Oeda
2009/0055607 A1 2/2009 Schack et al.
2009/0077097 A1 3/2009 Lacapra et al.
2009/0080440 A1 3/2009 Balyan et al.
2009/0089344 A1 4/2009 Brown et al.
2009/0089487 A1 4/2009 Kwon et al.
2009/0094252 A1 4/2009 Wong et al.
2009/0094311 A1 4/2009 Awadallah et al.
2009/0097480 A1 4/2009 Curtis et al.
2009/0106255 A1 4/2009 Lacapra et al.
2009/0106263 A1 4/2009 Khalid et al.
2009/0106413 A1 4/2009 Salo et al.
2009/0125955 A1 5/2009 DeLorme
2009/0132616 A1 5/2009 Winter et al.
2009/0138314 A1 5/2009 Bruce
2009/0161542 A1 6/2009 Ho
2009/0187915 A1 7/2009 Chew et al.
2009/0204649 A1 8/2009 Wong et al.
2009/0204650 A1 8/2009 Wong et al.
2009/0204705 A1 8/2009 Marinov et al.
2009/0210431 A1 8/2009 Marinkovic et al.
2009/0210875 A1 8/2009 Bolles et al.
2009/0217163 A1 8/2009 Jaroker
2009/0217386 A1 8/2009 Schneider
2009/0240705 A1 9/2009 Miloushev et al.
2009/0240899 A1 9/2009 Akagawa et al.
2009/0241176 A1 9/2009 Beletski et al.
2009/0254592 A1 10/2009 Marinov et al.
2009/0265396 A1 10/2009 Ram et al.
2009/0265467 A1 10/2009 Peles
2009/0289828 A1 11/2009 Hinchey
2009/0292957 A1 11/2009 Bower et al.
2009/0300161 A1 12/2009 Pruitt et al.
2009/0313503 A1 12/2009 Atluri et al.
2009/0316708 A1 12/2009 Yahyaoui et al.
2009/0319600 A1 12/2009 Sedan et al.
2010/0017423 A1* 1/2010 Koifman ..... G06F 3/0623
707/E17.009
2010/0017643 A1 1/2010 Baba et al.
2010/0030777 A1 2/2010 Panwar et al.
2010/0042743 A1 2/2010 Jeon et al.
2010/0061232 A1 3/2010 Zhou et al.
2010/0064001 A1 3/2010 Daily
2010/0070476 A1 3/2010 O'Keefe et al.
2010/0082542 A1 4/2010 Feng et al.
2010/0093318 A1 4/2010 Zhu et al.
2010/0122248 A1 5/2010 Robinson et al.
2010/0131654 A1 5/2010 Malakapalli et al.
2010/0179984 A1 7/2010 Sebastian
2010/0199042 A1 8/2010 Bates et al.
2010/0205206 A1 8/2010 Rabines et al.
2010/0211547 A1 8/2010 Kamei et al.
2010/0228814 A1 9/2010 McKenna et al.
2010/0228819 A1 9/2010 Wei
2010/0242092 A1 9/2010 Harris et al.
2010/0250497 A1 9/2010 Redlich et al.
2010/0274772 A1 10/2010 Samuels
2010/0306169 A1 12/2010 Pishevar et al.
2010/0325257 A1 12/2010 Goel et al.
2010/0325634 A1 12/2010 Ichikawa et al.
2011/0055921 A1 3/2011 Narayanaswamy et al.
2011/0066736 A1 3/2011 Mitchell et al.
2011/0072321 A1 3/2011 Dhuse
2011/0075667 A1 3/2011 Li et al.
2011/0083185 A1 4/2011 Sheleheda et al.
2011/0087696 A1 4/2011 Lacapra
2011/0093471 A1 4/2011 Brockway et al.
2011/0098087 A1 4/2011 Tseng
2011/0099146 A1 4/2011 McAlister et al.
2011/0099420 A1 4/2011 McAlister et al.
2011/0107112 A1* 5/2011 Resch ..... 713/193
2011/0113095 A1 5/2011 Hatami-Hama
2011/0119234 A1 5/2011 Schack et al.
2011/0153985 A1 6/2011 Saha et al.
2011/0185082 A1 7/2011 Thompson
2011/0188415 A1 8/2011 Graziano
2011/0213911 A1 9/2011 Eldus et al.
2011/0296411 A1 12/2011 Tang et al.
2011/0320882 A1 12/2011 Beaty et al.
2012/0042115 A1 2/2012 Young
2012/0078856 A1 3/2012 Linde
2012/0117028 A1 5/2012 Gold et al.
2012/0144229 A1 6/2012 Nadolski
2012/0150699 A1 6/2012 Trapp et al.
2012/0150805 A1 6/2012 Pafumi et al.
2012/0195273 A1 8/2012 Iwamura et al.
2012/0254293 A1 10/2012 Winter et al.
2012/0257506 A1 10/2012 Bazlamacci et al.
2012/0258766 A1 10/2012 Cho et al.
2013/0007239 A1 1/2013 Agarwal et al.
2013/0058229 A1 3/2013 Casado et al.
2013/0058252 A1 3/2013 Casado et al.
2013/0058255 A1 3/2013 Casado et al.
2013/0182713 A1 7/2013 Giacomoni et al.
2013/0238472 A1 9/2013 Fan et al.
2015/0058595 A1 2/2015 Gura et al.

FOREIGN PATENT DOCUMENTS

CA 2512312 A1 7/2004
EP 0605088 A3 7/1994
EP 0605088 A3 2/1996
EP 0 738 970 A1 10/1996
EP 1081918 A2 3/2001
JP 63010250 A 1/1988
JP 06-205006 7/1994
JP 6205006 A 7/1994
JP 06-332782 12/1994
JP 8021924 B 3/1996
JP 08-328760 12/1996
JP 08-339355 12/1996
JP 9016510 A 1/1997
JP 11282741 A 10/1999
NZ 566291 A 12/2008
WO WO 00/58870 A2 10/2000
WO WO 02/39696 A2 5/2002
WO WO 02/056181 A2 7/2002
WO WO 2004/061605 A2 7/2004
WO WO 2006/091040 A1 8/2006
WO WO 2008/130983 A1 10/2008
WO WO 2008/147973 A2 12/2008

OTHER PUBLICATIONS

"Market Research & Releases, Solstice Diameter Requirements", last accessed Mar. 29, 2010, (http://mainstreet/sites/PD/Teams/ProdMgmt/MarketResearch/Unisversal).
"Respond to server depending on TCP::client_port", DevCentral Forums iRules, pp. 1-6, last accessed Mar. 26, 2010, (http://devcentral.f5.com/Default/aspx?tabid=53&forumid=5&tpage=l&v).
"UDDI Overview", Sep. 6, 2000, pp. 1-21, uddi.org, (http://www.uddi.org/).
"UDDI Technical White Paper," Sep. 6, 2000, pp. 1-12, uddi-org, (http://www.uddi.org/).
"UDDI Version 3.0.1" UDDI Spec Technical Committee Specification, Oct. 14, 2003, pp. 1-383, uddi.org, (http://www.uddi.org/).

(56) References Cited

OTHER PUBLICATIONS

"3-DNS® Reference Guide version 4.5," Sep. 2002, pp. 2-1-2-28, 3-1-3-12, 5-1-5-24, F5 etworks, Inc., Seattle, Washington.
"BIG-IP® Reference Guide version 4.5," Sep. 2002, pp. 11-1-11-32, F5 Networks, Inc., Seattle Washington.
"CSA Persistent File System Technology," A White Paper, Jan. 1, 1999, p. 1-3, http://www.cosoa.com/white_papers/pfs.php, Colorado Software Architecture, Inc.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
"Routing Global Internet Users to the Appropriate Data Center and Applications Using F5's 3-DNS Controller," Aug. 2001, pp. 1-4, F5 Networks, Inc., Seattle, Washington, http://www.f5.com/f5products/3dns/relatedMaterials/3DNSRouting.html.
"Scaling Next Generation Web Infrastructure with Content-Intelligent Switching: White Paper," Apr. 2000, p. 1-9 Alteon Web Systems, Inc.
"Using F5's 3-DNS Controller to Provide High Availability Between Two or More Data Centers," F5 Networks, Inc., Aug. 2001, pp. 1-3, F5 Networks, Inc., Seattle, Washington, http://www.f5.com/f5products/3dns/related/Materials/UsingF5.html.
"Veritas SANPoint Foundation Suite(tm) and SANPoint Foundation Suite(tm) HA: New Veritas Volume Management and File System Technology for Cluster Environments," Sep. 2001, Veritas Software Corp.
"Windows Clustering Technologies—An Overview," Nov. 2001, Microsoft Corp., www.microsoft.com, last accessed on Dec. 30, 2002.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson et al., "Serverless Network File System," in the 15th Symposium on Operating Systems Principles, Dec. 1995, Association for Computing Machinery, Inc.
Anderson, Darrell C. et al., "Interposed Request Routing for Scalable Network Storage," ACM Transactions on Computer Systems 20(1): (Feb. 2002), pp. 1-24.
Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Baer, T., et al., "The elements of Web services" ADTmag.com, Dec. 1, 2002, pp. 1-6, (http://www.adtmag.com).
Basney et al., "Credential Wallets: A Classification of Credential Repositories Highlighting MyProxy," TPRC 2003, Sep. 19-21, 2003, pp. 1-20.
Bill Schilit, "Bootstrapping Location-Enhanced Wen Services," Dec. 4, 2003, University of Washington, Seattle, Washington, http://www.cs.washington.edu/news/colloq.info.html.
Blue Coat, "Technology Primer: CIFS Protocol Optimization," Blue Coat Systems Inc., 2007, pp. 1-3, (http://www.bluecoat.com).
Botzum, Keys, "Single Sign On—A Contrarian View," Open Group Website, <http://www.opengroup.org/security/topics.htm>, Aug. 6, 2001, pp. 1-8.
Brent Sleeper, "The Evolution of UDDI: UDDI.org White Paper," Jul. 19, 2002, pp. 1-15, The Stencil Group, Inc., San Francisco, California, http://www.uddi.org/pubs/the_evolution_of_uddi_20020719.pdf.
Brent Sleeper, "Why UDDI Will Succeed, Quietly: Two Factors Push Web Services Forward," Apr. 2001, pp. 1-7, The Stencil Group, Inc., San Francisco, California, http://www.stencilgroup.com/ideas_scope_200104uddi.pdf.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Cavale, M. R., "Introducing Microsoft Cluster Service (MSCS) in the Windows Server 2003", Microsoft Corporation, Nov. 2002.
Dawn Kawamoto, "Amazon Files for Web Services Patent," CNET News.com, Jul. 28, 2005, pp. 1-2, http://www.news.com.
F5 Networks Inc., "Case Information Log for 'Issues with BoNY upgrade to 4.3'", as early as Feb. 2008.
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's-DNS Controller To Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
Fajardo V., "Open Diameter Software Architecture," Jun. 25, 2004, pp. 1-6, Version 1.0.7.
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Frank Sommers, "What's New in UDDI 3.0—Part 1," Jan. 27, 2003, pp. 1-5, Web Services.Org, http://www.webservices.org/index/php/article/articleview/871/1/24.
Frank Sommers, "What's New in UDDI 3.0—Part 2," Feb. 3, 2003, pp. 1-7, Web Services.Org, http://www.webservices.org/index.php/article/articleview/881/1/24/.
Frank Sommers, "What's New in UDDI 3.0—Part 3," Feb. 2, 2003, pp. 1-4, WebServices.Org, http://www.webservices.org/index/php/article/articleview/894/1/24/.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Heinz G., "Priorities in Stream Transmission Control Protocol (SCTP) Multistreaming", Thesis submitted to the Faculty of the University of Delaware, Spring 2003, pp. 1-35.
International Search Report for International Patent Application No. PCT/US2008/083117 (dated Jun. 23, 2009).
International Search Report for International Patent Application No. PCT/US2008/060449 (dated Apr. 9, 2008).
International Search Report for International Patent Application No. PCT/US2008/064677 (dated Sep. 6, 2009).
International Search Report for International Patent Application No. PCT/US02/00720, dated Mar. 19, 2005.
International Search Report from International Application No. PCT/US03/41202, dated Sep. 15, 2005.
Karamanolis, C. et al., "An Architecture for Scalable and Manageable File Services," HPL-2001-173, Jul. 26, 2001. p. 1-114.
Kawamoto, D., "Amazon files for Web services patent", CNET News.com, Jul. 28, 2005, pp. 1-2, (http://news.com).
Kohl et al., "The Kerberos Network Authentication Service (V5)," RFC 1510, Sep. 1993. (http://www.ietf.org/rfc/rfc1510.txt?number=1510).

(56) References Cited

OTHER PUBLICATIONS

Korkuzas, V., Communication pursuant to Article 96(2) EPC dated Sep. 11, 2007 in corresponding European patent application No. 02718824.2-2201.
LaMonica M., "Infravio spiffs up Web services registry idea", CNET News.com, May 11, 2004, pp. 1-2, last accessed Sep. 20, 2004, (http://www.news.com).
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
Modiano E., "Scheduling Algorithms for Message Transmission Over a Sattellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Norton et al., "CIFS Protocol Version CIFS-Spec 0.9," 2001, Storage Networking Industry Association (SNIA), www.snia.org, last accessed on Mar. 26, 2001.
Ott D., et al., "A Mechanism for TCP-Friendly Transport-level Protocol Coordination", USENIX Annual Technical Conference, Jun. 10, 2002, University of North Carolina at Chapel Hill, pp. 1-12.
Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 1-4, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.
Rich Seeley, "Can Infravio technology revive UDDI?," Application Development Trends, Oct. 22, 2003, p. 1, Application Development Trends, Framingham, MA, http://www.admag.com.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
RSYNC, "Welcome to the RSYNC Web Pages," Retrieved from the Internet URL: http://samba.anu.edu.ut.rsync/. (Retrieved on Dec. 18, 2009).
Shohoud, Y., "Building XML Web Services with VB .NET and VB 6", Addison Wesley, 2002, pp. 1-14.
Soltis et al., "The Global File System," Sep. 17-19, 1996, in Proceedings of the Fifth NASA Goddard Space Flight Center Conference on Mass Storage Systems and Technologies, College Park, Maryland.
Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.
Stakutis, C., "Benefits of SAN-based file system sharing," Jul. 2000, pp. 1-4, InfoStor, www.infostor.com, last accessed on Dec. 30, 2002.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, vol. 14, No. 1, ACM Transactions on Computer Systems.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexploreleee.org/xpl/freeabs_all.jsp?arnumber=832499).
Yasser Shohoud, "Building XML Wen Services with VB .NET and VB 6," 2002, pp. 1-14, Addison Wesley, Boston, Massachusetts.
Zayas, E., "AFS-3 Programmer's Reference: Architectural Overview," Transarc Corp., version 1.0 of Sep. 2, 1991, doc. No. FS-00-D160.
"The AFS File System in Distributed Computing Environment," www.transarc.ibm.com/Library/whitepapers/AFS/afsoverview.html, last accessed on Dec. 20, 2002.
Aguilera et al., "Improving recoverability in multi-tier storage systems," International Conference on Dependable Systems and Networks (DSN-2007), Jun. 2007, 10 pages, Edinburgh, Scotland.
Anderson et al., "Interposed Request Routing for Scalable Network Storage," ACM Transactions on Computer Systems 20(1): (Feb. 2002), pp. 1-24.
Anderson et al., "Serverless Network File System," in the 15th Symposium on Operating Systems Principles, Dec. 1995, 40 pages, Association for Computing Machinery, Inc.
Anonymous, "How DFS Works: Remote File Systems," Distributed File System (DFS) Mar. 2003, 54 pages, Technical Reference retrieved from the Internet on Feb. 13, 2009, URL<http://technetmicrosoft.com/en-us/library/cc782417(WS.10,printer).aspx>.
Apple, Inc., "Mac OS X Tiger Keynote Intro. Part 2," Jun. 2004, www.youtube.com <http://www.youtube.com/watch?v=zSBJwEmRJbY>, 1 page.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spo tlight.html>, pp. 1-6.
"A Storage Architecture Guide," Second Edition, 2001, Auspex Systems, Inc., www.auspex.com, last accessed on Dec. 30, 2002.
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Botzum, Keys, "Single Sign on—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the—Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, 22 pages, Technical report No. UCSC-CRL-92-09 of the Computer & Information Sciences Department of University of California at Santa Cruz.
Callaghan et al., "NFS Version 3 Protocol Specifications" (RFC 1813), Jun. 1995, 127 pages, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.

(56) References Cited

OTHER PUBLICATIONS

Cavale, M. R., "Introducing Microsoft Cluster Service (MSCS) in the Windows Server 2003", Nov. 2002, 10 pages, Microsoft Corporation.
"CSA Persistent File System Technology," A White Paper, Jan. 1, 1999, pp. 1-3, http://www.cosoa.com/white_papers/pfs.php, Colorado Software Architecture, Inc.
"Distributed File System: A Logical View of Physical Storage: White Paper," 1999, Microsoft Corp., www.microsoft.com, <http://www.eu.microsoft.com/TechNet/prodtechnol/windows2000serv/maint-ain/DFSnt95>, pp. 1-26, last accessed on Dec. 20, 2002.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.
Farley, M., "Enterprise Storage Forum," Jan. 2000, 2 pages, Book Review-Building Storage Networks, 2nd Edition, http://www.enterprisestorageforum.com/sans/features/print/0,,10556_1441201.00. html, Enterprise Storage Forum Staff, last accessed Dec. 20, 2002.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Gibson et al., "NASD Scalable Storage Systems," Jun. 1999, 6 pages, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single 1/0 Space," IEEE Concurrency, Jan.-Mar. 1999, pp. 60-69.
International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT /US02/00720, Jul. 8, 2004.
International Search Report from International Application No. PCT/US03/41202, mailed Sep. 15, 2005.
Karamanolis, C. et al., "An Architecture for Scalable and Manageable File Services," HPL-2001-173, Jul. 26, 2001. pp. 1-114.
Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers," 13th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993, 105 pages, http://www.ietf.org/ rfc/rfc1510.txt?number=1510.
Korkuzas, V., Communication pursuant to Article 96(2) EPC dated Sep. 11, 2007 in corresponding European patent application No. 02718824.2-2201, 3 pages.
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.
Long et al., "Swift/RAID: A distributed RAID System", Computing Systems, Summer 1994, 20 pages, vol. 7.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, 125 pages, Storage Networking Industry Association (SNIA), www.snia.org, last accessed on Mar. 26, 2001.
Novotny et al., "An Online Credential Repository for the Grid: MyProxy," 2001, pp. 1-8.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29,-Dec. 3, 2004, 5 pages, Royal Holloway, University of London.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 677-680, vol. 33, No. 6.
Peterson, M., "Introducing Storage Area Networks," Feb. 1998, 6 pages, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers- /preslan/presl, last accessed on Dec. 20, 2002.
Response filed Jul. 6, 2007 to Office action dated Feb. 6, 2007 for related U.S. Appl. No. 10/336,784, 24 pages.
Response filed Mar. 20, 2008 to Final Office action dated Sep. 21, 2007 for related U.S. Appl. No. 10/336,784, 22 pages.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph—p. 868, col. 1, paragraph 1.
Rsync, "Welcome to the Rsync Web Pages," Retrieved from the Internet URL: http://samba.anu.edu.ut.rsync/. (Retrieved on Dec. 18, 2009 ), 5 pages.
Savage, et al., "AFRAID—A Frequently Redundant Array of Independent Disks," Jan. 22-26, 1996, pp. 1-13, USENIX Technical Conference, San Diego, California.
"Scaling Next Generation Web Infrastructure with Content-Intelligent Switching: White Paper," Apr. 2000, pp. 1-9, Alteon Web Systems, Inc.
Soltis et al., "The Design and Performance of a Shared Disk File System for IRIX," Mar. 23-26, 1998, pp. 1-17, Sixth NASA Goddard Space Flight Center Conference on Mass Storage and

(56) References Cited

OTHER PUBLICATIONS

Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Uesugi, H., Jul. 15, 2008 letter from Japanese associate reporting office action dated May 26, 2008 in corresponding Japanese patent application No. 2002-556371, 2 pages.
"Veritas SANPoint Foundation Suite(tm) and SANPoint Foundation Suite(tm) HA:New Veritas volume Management and File System Technology for Cluster Environments," Sep. 2001, 26 pages, Veritas Software Corp.
Wilkes, J., et al., "The HP AutoRAID Hierarchical Storage System," Feb. 1996, 29 pages, vol. 14, No. 1, ACM Transactions on Computer Systems.
"Windows Clustering Technologies—An Overview," Nov. 2001, 31 pages, Microsoft Corp., www.microsoft.com, last accessed on Dec. 30, 2002.
Zayas, E., "AFS-3 Programmer's Reference: Architectural Overview," Sep. 2, 1991, 37 pages, Version 1.0 (doc. No. FS-00-D160) Transarc Corporation.
Gupta et al., "Algorithms for Packet Classification", Computer Systems Laboratory, Stanford University, CA, Mar./Apr. 2001, pp. 1-29.
Heinz II G., "Priorities in Stream Transmission Control Protocol (SCTP) Multistreaming", Thesis submitted to the Faculty of the University of Delaware, Spring 2003, pp. 1-35.
Internet Protocol,"DARPA Internet Program Protocol Specification", (RFC:791), Information Sciences Institute, University of Southern California, Sep. 1981, pp. 1-49.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Modiano E., "Scheduling Algorithms for Message Transmission Over a Satellite Broadcast System," MIT Lincoln Laboratory Advanced Network Group, Nov. 1997, pp. 1-7.
Ott D., et al., "A Mechanism for TCP-Friendly Transport-level Protocol Coordination", USENIX Annual Technical Conference, 2002, University of North Carolina at Chapel Hill, pp. 1-12.
Padmanabhan V., et al., "Using Predictive Prefetching to Improve World Wide Web Latency", SIGCOM, 1996, pp. 1-15.
Rosen E., et al., "MPLS Label Stack Encoding", (RFC:3032) Network Working Group, Jan. 2001, pp. 1-22, (http://www.ietf.org/rfc/rfc3032.txt).
Wang B., "Priority and Realtime Data Transfer Over the Best-Effort Internet", Dissertation Abstract, Sep. 2005, ScholarWorks@UMASS.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR ACCESSING DATA IN A COMPRESSED FILE SYSTEM AND DEVICES THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

This technology generally relates to accessing object data in a compressed file system, and, more particularly, to efficient methods and devices for servicing read and write data access requests independent of protocol.

BACKGROUND

In order to optimize utilization of relatively fast storage devices having limited capacity, such as in a tiered file storage system, relatively infrequently accessed files are often compressed into blocks of data and archived in relatively slow storage devices of the tiered storage system. Accessing an archived file, such as in response to a read or write request, generally requires decompressing the entire file, as identified based on a file handle or other identifier included in the request, in order to locate a portion of the file identified by a start offset and/or a length included in the request.

Accordingly, although such read and write requests often identify only a portion of the original file, all of the compressed blocks associated with the original file must be retrieved and decompressed in order to locate the requested portion, in order to service a read request, or locate the portion to be written, in order to service a write request. Additionally, in order to service a write request, the entire original file generally must be recompressed, subsequent to the write procedure, even though only a portion of the original file may have been modified. Retrieving and decompressing all of the compressed blocks associated with a file, and in the case of a write request, recompressing an entire file, requires significant time and resources thereby increasing the response time to the requesting client computing device, which is undesirable.

SUMMARY

A method for managing requests for content includes obtaining with a network traffic management apparatus an original write request from a client computing device including at least object data. The object data is compressed with the network traffic management apparatus into a plurality of compressed blocks. A mapping of each compressed block to a portion of the object data compressed therein is generated with the network traffic management apparatus, wherein the portion of the object data compressed therein is represented in the mapping by a unique object identifier, a start offset, and a length. The compressed blocks and the mapping are stored with the network traffic management apparatus in at least one data storage device. At least one data access request for at least a portion of the object data is serviced with the network traffic management based on the mapping.

A non-transitory computer readable medium having stored thereon instructions for managing requests for content comprising machine executable code which when executed by at least one processor, causes the processor to perform steps including obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

A network traffic management apparatus includes a memory, configurable logic, and a processor coupled to the memory and the configurable logic, at least one of the configurable logic configured to implement or the processor configured to execute programmed instructions stored in the memory including obtaining an original write request from a client computing device including at least object data. The object data is compressed into a plurality of compressed blocks. A mapping of each compressed block to a portion of the object data compressed therein is generated, wherein the portion of the object data compressed therein is represented in the mapping by a unique object identifier, a start offset, and a length. The compressed blocks and the mapping are stored in at least one data storage device. At least one data access request for at least a portion of the object data is serviced based on the mapping.

This technology provides a number of advantages including methods, non-transitory computer readable medium, and devices that efficiently access data in a compressed file system, the data being required to service read or write data access requests received from networked client computing devices. With this technology, a mapping of object data to compressed blocks including compressed object data is stored and utilized to retrieve only a portion of the compressed blocks storing the object data required to service a read or write request. Accordingly, only a subset of the compressed blocks storing object data needs to be decompressed to service a read request for only a portion of a file. Additionally, only a subset of the compressed blocks storing object data needs to be decompressed, modified, and rewritten to service a write request that does not require additional storage space beyond the fixed size of the compressed blocks. As a result, resource utilization is improved as well as response time, thereby improving the user experience with the file storage system.

DETAILED DESCRIPTION

Figure 1:
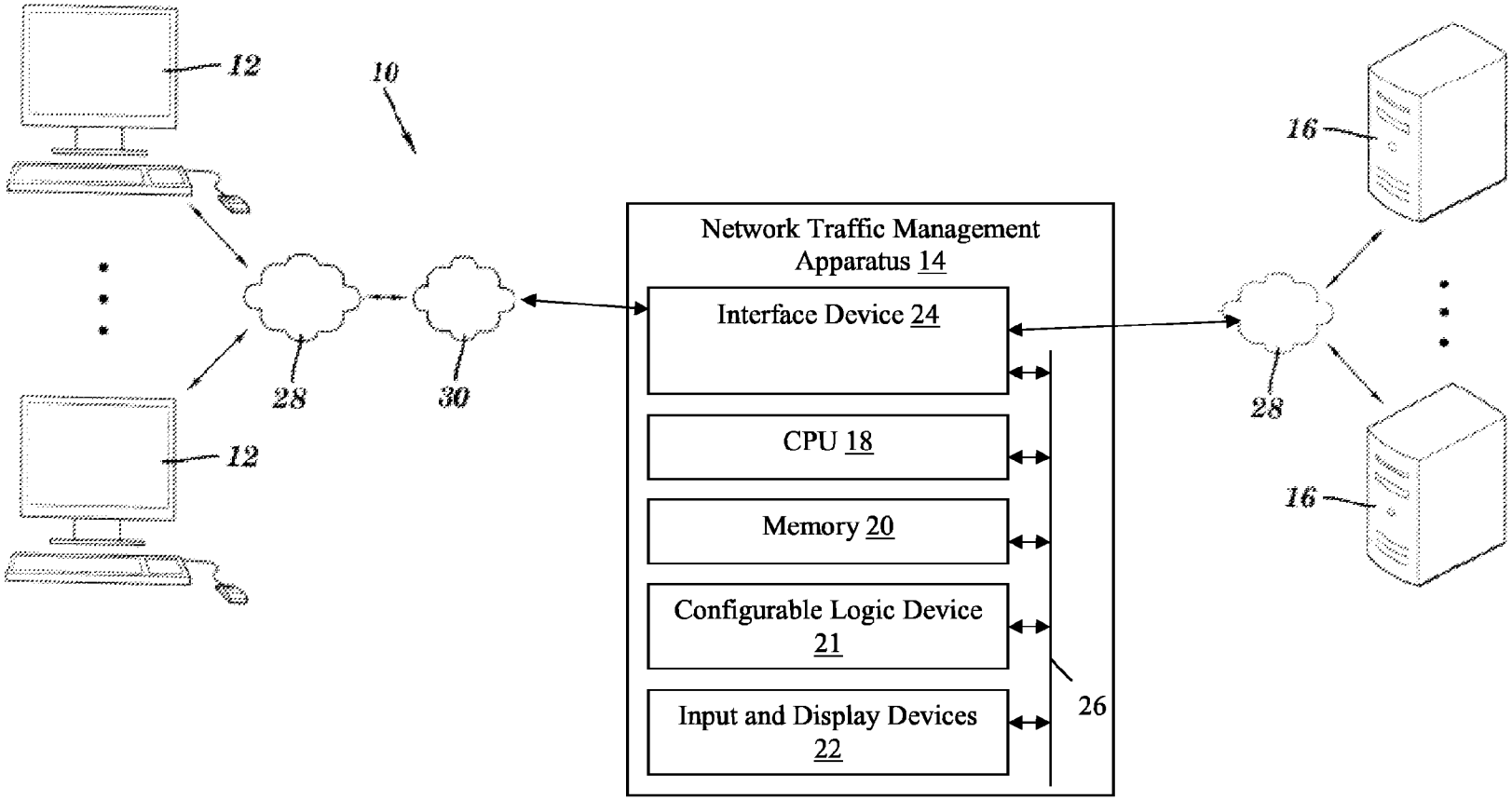
FIG. 1 is a block diagram of a network environment with an exemplary network traffic management apparatus that accesses data in a compressed file system.

A network environment 10 with an exemplary network traffic management apparatus 14 for accessing data in a compressed file system is illustrated in FIG. 1. In this example, the environment 10 includes client computing devices 12, network traffic management apparatus 14, and servers 16, which are coupled together by local area networks (LAN) 28 and wide area network (WAN) 30, although other types and numbers of devices, components, and elements in other topologies could be used. While not shown, the environment 10 also may include additional network components, such as routers, switches and other devices, which are well known to those of ordinary skill in the art and thus will not be described here. This technology provides a number of advantages including methods, non-transitory computer readable medium, and apparatus that efficiently service data access requests in a compressed file storage system.

In this example, the network traffic management apparatus 14 is coupled to client computing devices 12 through one of the LANs 28, although the client computing devices 12, or other devices, and network traffic management apparatus 14 may be coupled together via other topologies. Additionally, the network traffic management apparatus 14 is coupled to the servers 16 through another one of the LANs 28, although the servers 16, or other devices, and the network traffic management apparatus 14 may be coupled together via other topologies. LANs 28 each may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The network traffic management apparatus 14 is further coupled to client computing devices 12 through WAN 30, which may comprise any wide area network (e.g., Internet), although any other type of traffic network topology may be used. Various network processing applications, such as CIFS applications, NFS applications, HTTP Web Server applications, and/or FTP applications, may be operating on servers 16 and transmitting data (e.g., files, Web pages) through the network traffic management apparatus 14 in response to requests for content from client computing devices 12.

The network traffic management apparatus 14 facilitates servicing of data access requests in a compressed file storage system as illustrated and described with the examples herein, although network traffic management apparatus 14 may perform other types and numbers of functions, such as optimizing, securing and accelerating the traffic between client computing devices 12 and servers 16, and/or one or more applications. Network traffic management apparatus 14 includes at least one processor 18, memory 20, optional configurable logic device 21, I/O interface 22, and interface device 24 which are coupled together by bus 26, although network traffic management apparatus 14 may comprise other types and numbers of elements in other configurations. Although network traffic management apparatus 14 is shown in this example as being a standalone device, such as a BIGIP® device offered by F5 Networks, Inc., of Seattle, Wash., it should be appreciated that the network traffic management apparatus 14 could also be one of several blades servers coupled to a chassis device, such as a VIPRION® device, also offered by F5 Networks, Inc., of Seattle, Wash.

Processor(s) 18 may execute one or more computer-executable instructions stored in the memory 20 for the methods illustrated and described with reference to the examples, although the processor(s) can execute other types and numbers of instructions and perform other types and numbers of operations. The processor(s) 18 may comprise one or more central processing units (CPUs) or general purpose processors with one or more processing cores, such as AMD® processor(s), although other types of processor(s) could be used (e.g., Intel®).

Memory 20 may comprise one or more tangible storage media and/or devices, such as RAM, ROM, flash memory, CD-ROM, floppy disk, hard disk drive(s), solid state memory, DVD, or any other memory storage types or devices, including combinations thereof, which are known to those of ordinary skill in the art. The various storage devices of the memory 20 may be arranged in a tiered storage system to allow for less expensive and larger capacity storage devices, for example, to store less frequently accessed, compressed and/or archived data.

Figure 2:
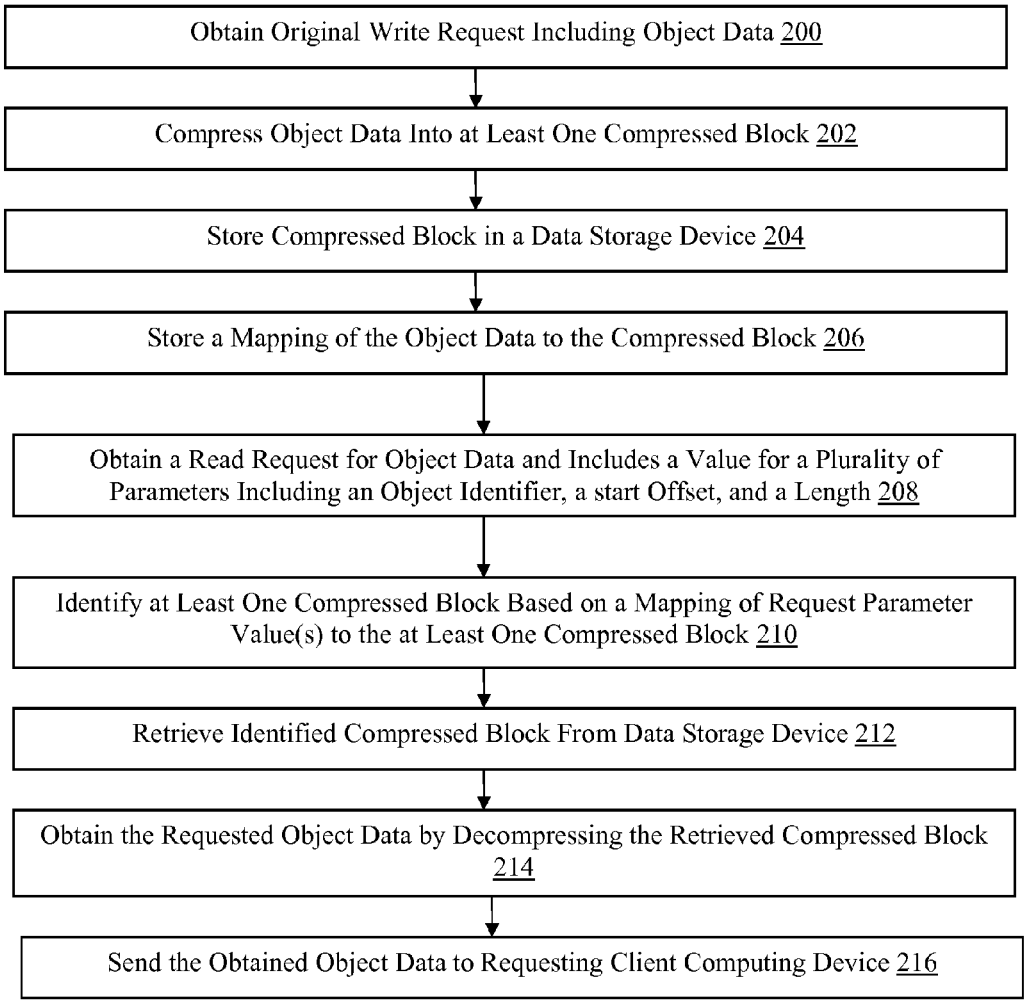
FIG. 2 is a flowchart of an exemplary method for servicing read data access requests in a compressed file system.
Figure 3:
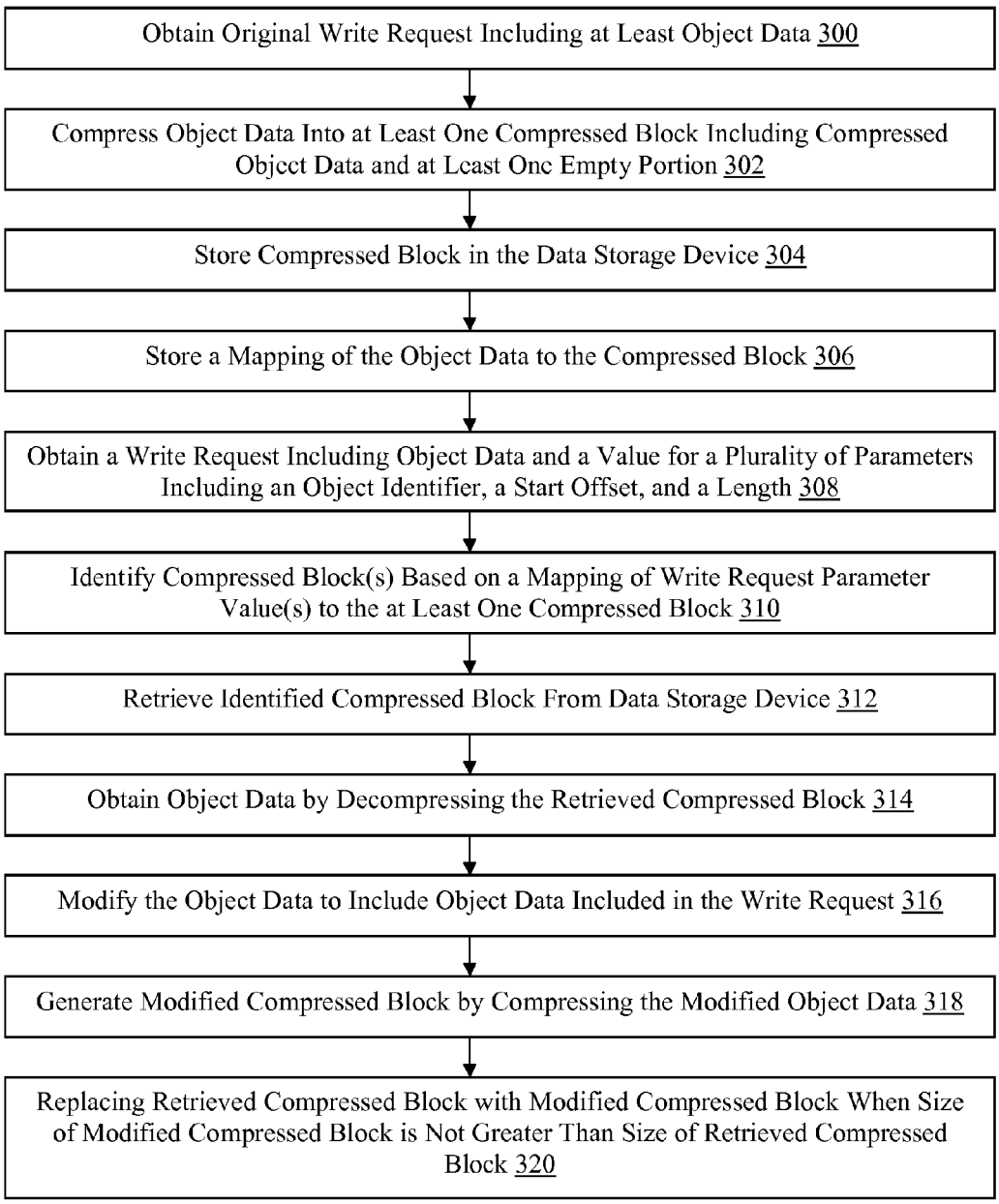
FIG. 3 is a flowchart of an exemplary method for servicing write data access requests in a compressed file system.

Memory 20 may store one or more non-transitory computer-readable instructions of this technology as illustrated and described with reference to the examples herein that may be executed by the one or more processor(s) 18. The flow charts shown in FIGS. 2 and 3 are representative of example steps or actions of this technology that may be embodied or expressed as one or more non-transitory computer or machine readable instructions stored in memory 20 that may be executed by the processor(s) 18 and/or may be implemented by configured logic in optional configurable logic device 21.

The optional configurable logic device 21 may comprise specialized hardware configured to implement one or more steps of this technology as illustrated and described with reference to the examples herein. By way of example only, the optional configurable logic device 21 may comprise one or more of field programmable gate arrays (FPGAs), field programmable logic devices (FPLDs), application specific integrated circuits (ASICs) and/or programmable logic units (PLUs).

Input and display devices 22 enable a user, such as an administrator, to interact with the network traffic management apparatus 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the network traffic management apparatus 14 is used to operatively couple and communicate between the network traffic management apparatus 14 and the client computing devices 12 and the servers 16, which are all coupled together by one or more local area networks (LAN) 28 and wide area networks (WAN) 30, although other types and numbers of communication networks or systems with other types and numbers of connections and configurations to other devices and elements. By way of example only, the local area networks (LAN) 28 and wide area networks (WAN) 30 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the client computing devices 12 and the servers 16 include a central processing unit (CPU) or processor, a memory, an interface device, and an I/O system, which are coupled together by a bus or other link, although other numbers and types of network devices could be used. The client computing devices 12, in this example, may run interface applications, such as Web browsers, that may provide an interface to make requests for and send content and/or data to different server-based applications via the LANs 28 and/or WANs 30.

Generally, servers 16 process requests received from client computing devices 12 via LANs 28 and/or WANs 30 according to the HTTP-based application RFC protocol or the CIFS or NFS protocol in this example, but the principles discussed herein are not limited to this example and can include other application protocols. A series of applications may run on the servers 16 that allow the transmission of data, such as object data, files, and/or metadata, requested by the client computing devices 12. The servers 16 may provide data or receive data in response to requests directed toward the respective applications on the servers 16 from the client computing devices 12. In some example, the servers 16 may further include various storage devices including a tiered file storage system and/or may be one or more tiers of a tiered file storage system including one or more other network devices. Accordingly the servers 16 can provide backup, archived, and/or compressed data storage services for other networked devices. It is to be understood that the servers 16 may be hardware or software or may represent a system with multiple servers 16 in a server pool, which may include internal or external networks. In this example the servers 16 may be any version of Microsoft® IIS servers or Apache® servers, although other types of servers may be used. Further, additional servers may be coupled to the LAN 28 and many different types of applications may be available on servers coupled to the LAN 28.

Although an exemplary network environment 10 with client computing devices 12, network traffic management apparatus 14, servers 16, LANs 28 and WANs 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for servicing read data access requests in a compressed file system will now be described with reference to FIGS. 1-2. In this particular example, in step 200, the network traffic management apparatus 14 obtains at least one original write request including at least the object data to be stored, although in other examples the data may already compressed and stored as described here with reference to steps 200, 202, 204, and 206.

In step 202, the network traffic management apparatus 14 compresses the object data into at least one compressed block. In some examples, each compressed block has a fixed size or length, such as 64 kilobytes, for example, although the compressed blocks may be any other fixed size or of variable size.

In step 204, the network traffic management apparatus 14 stores the compressed blocks in the memory 20, although the compressed blocks can be stored in other data storage devices and at other locations. For example, the compressed blocks could be stored in one or more file server devices 16, a tiered storage system including the memory 20 and/or one or more file server devices 16, and/or any other data storage device(s).

In step 206, the network traffic management apparatus 14 maintains and stores a mapping of the original object data to the compressed blocks of object data, which the network traffic management apparatus 14 in the memory 20, although the mapping could be stored in other locations. One exemplary mapping is a table including object identifier, start offset, and length values for the object data included in the original write request associated with a unique identifier of the compressed block storing the compressed object data for the portion of the object data indicated by the associated start offset and length values, although other mappings of the original object data to the compressed object data can be used.

In one example, the unique identifier for each compressed block includes a file handle or other identifier shared by a plurality of compressed blocks storing compressed data for the same object as well as a start offset and a length value that together uniquely identify each compressed block. In the latter example, and in the exemplary operation in which the compressed blocks are of a fixed size, the length values will all be the same and the start offsets will all be intervals determined by the length value. In order to locate the compressed blocks at a later time, the network traffic management apparatus 14 can store a mapping of the unique identifier for each compressed block to a location of the compressed block in the data storage device or utilize any other method of maintaining the location of the compressed blocks.

In step 208, the network traffic management apparatus 14 obtains a read data access request from a client computing device 12 for object data previously stored as described and illustrated earlier with respect to steps 200, 202, 204, and 206. The read request can be based on any protocol requiring at least object identifier or file handle, start offset, and length parameters, the length parameter indicating a number of bytes, for example, including a common Internet file system (CIFS) protocol, a network file system (NFS) protocol, or a file transfer protocol (FTP), for example.

In step 210, the network traffic management apparatus 14 identifies at least one compressed block storing compressed object data required to service the read request by querying the table based on the read request parameter values. Accordingly, in one example, a read request is obtained by the network traffic management apparatus 14 from a client computing device 12 including at least parameter values $F_O$ for the object identifier, 50 for the start offset, and 100 for the length. In this example, the mapping stored in step 206 for object $F_0$ indicates that the compressed block having a unique identifier of $C_0$ is storing start offset 0 and length 100, the compressed block having a unique identifier of $C_1$ is storing start offset 100 and length 100, and the compressed block having a unique identifier of $C_2$ is storing start offset 200 and length 75. Accordingly, in step 210, the network traffic management apparatus 14 identifies compressed blocks $C_0$ and $C_1$ based on the mapping of the object data byte range 50-150, as identified by the read request parameter values of 50 for the start offset and 100 for the length.

In step 212, the network traffic management apparatus 14 retrieves the identified compressed blocks from the data storage device. Accordingly, in this example, the network traffic management apparatus 14 retrieves compressed blocks $C_0$ and $C_1$ from a data storage device, such as one of server devices 16.

In step 214, the network traffic management apparatus 14 obtains the requested object data by decompressing the retrieved compressed blocks. Accordingly, in this example, blocks $C_0$ and $C_1$ are decompressed by the network traffic management apparatus 14 and the object data responsive to the received read request in step 208 is obtained based on the read request parameter values.

In step 216, the obtained object data is sent by the network traffic management apparatus 14 to the requesting one of the client computing devices 12. Because the read request included parameter values of 50 for the start offset and 100 for the length, in this example, only the second 50 bytes of object data included in compressed block $C_0$ and only the first 50 bytes of object data included in compressed block $C_1$ are obtained by the network traffic management apparatus 14, in step 214, and sent by the network traffic management apparatus 14, in step 216, to the requesting one of the client computing devices 12.

Accordingly, in this example, the read request received from the client computing device 12 is serviced by the network traffic management apparatus 14 without retrieving compressed block $C_2$ from the data storage device and without decompressing compressed block $C_2$. The ability of the network traffic management apparatus 14 to retrieve and decompress only those compressed blocks necessary to service a read request from a client computing device 12 is made possible by the mapping, stored in step 206, which allows the network traffic management apparatus 14 to identify only a subset of compressed blocks. As compressed files and objects are often archived in relatively slow data storage devices due to their relatively infrequent access by users of client computing devices 12, retrieving and decompressing only those necessary compressed blocks, instead of all compressed blocks storing object data for the object identified in the read request, can reduce resource utilization and response time, particularly when the number of compressed blocks not required to service the read request is substantial.

Referring to FIGS. 1 and 3, an exemplary method for servicing write data access requests in a compressed file system will now be described. In this particular example, the write request is a request to modify object data previously stored in the compressed file system as described with reference to steps 300, 302, 304, and 306.

In step 300, the network traffic management apparatus 14 obtains an original write request including at least the object data to be stored.

In step 302, the network traffic management apparatus 14 compresses the object data into at least one compressed block. In this example, each of the compressed blocks includes compressed object data and at least one empty portion. In some examples, the compressed blocks each have a fixed size, such as 64 kilobytes, 4 kilobytes of which is empty and does not include compressed object data, although any size of compressed block, compressed object data, and empty storage space can be used.

In step 304, the network traffic management apparatus 14 stores the compressed blocks in a data storage device such as the memory 20 of the network traffic management apparatus 14, one or more file server devices 16, a tiered storage system including the memory 20 and/or one or more file server devices 16, and/or any other data storage device(s).

In step 306, the network traffic management apparatus 14 maintains and stores a mapping of the original object data to the compressed blocks of object data.

In step 308, the network traffic management apparatus 14 obtains a write request from a client computing device 12 including a plurality of parameter values and object data to be used to modify object data previously stored as described and illustrated earlier with respect to steps 300, 302, 304, and 306. The write request can be based on any protocol requiring at least an object identifier or parameter value identifying the object to be modified, a start offset parameter value indicating the beginning location in the object to be modified, and a length parameter value indicating the portion of the object data to be modified. Accordingly, the protocol can include CIFS, NFS, or FTP, for example.

In step 310, the network traffic management apparatus 14 identifies at least one compressed block storing compressed object data required to service the write request by referencing the mapping, such as by querying a table storing the mapping, based on the write request parameter values. In step 312, the network traffic management apparatus 14 retrieves the identified compressed blocks.

In step 314, the network traffic management apparatus 14 obtains the object data to be modified by decompressing the retrieved compressed blocks. As at least a subset of the parameters are the same for a read request as for a write request, the identification of step 310, retrieval of step 312, and obtaining of step 314 can be performed by the network traffic management apparatus 14 as described and illustrated earlier with respect to steps 210, 212, and 214, respectively.

In step 316, the network traffic management apparatus 14 modifies the object data obtained in step 314 to include at least a portion of the object data included in the write request. In step 318, the network traffic management apparatus 14 generates modified compressed blocks by compressing the modified object data. Accordingly, the modified compressed blocks include compressed write request object data along with compressed object data that was previously stored and not currently modified.

The modified compressed blocks may be smaller, the same size, or larger than the corresponding compressed blocks retrieved, in step 312, by the network traffic management apparatus 14, depending on the size of the write request object data, the size of any previously stored object data that is replaced by the write request object data, and/or the compressibility of the object data as modified, for example. If a modified compressed block is not greater than the corresponding retrieved compressed block, the network traffic management apparatus 14 completes service of the write request by replacing, in step 320, the retrieved compressed block with the modified compressed block.

If the size of any compressed block is greater than the corresponding retrieved compressed block, the network traffic management apparatus 14 can retrieve every compressed block storing object data for the object identified by the write request object identifier parameter value, as identified based on the mapping. The network traffic management apparatus 14 can then decompress all of the retrieved compressed blocks, recompress the object data, and update the mapping. Because such an operation is relatively expensive, particularly with respect to compressed and archived data stored on relatively slow data storage device(s), including the empty portion in each compressed block when compressing the object data, in step 302, can provide for expansion of the compressed data upon servicing the write request, thereby reducing the number of instances in which a modified compressed block is greater in size than a corresponding retrieved compressed block.

Accordingly, in this example, in order to service a write data access request received from a client computing device 12, only those compressed blocks storing compressed object data required to service the write request are retrieved and decompressed by the network traffic management apparatus 14. Additionally, in examples in which a space for expansion is included by the network traffic management apparatus 14 in the form of an empty portion in the compressed blocks, the number of instances in which compressed blocks other than those necessary to service the write request will need to be retrieved, decompressed, recompressed, and stored can be reduced, thereby reducing resource utilization and response time.

The examples described herein have particular advantages for applications in which only portions of an archived object or file are read by a client computing device 12. Additionally, the examples described herein have particular advantages for applications in which only portions of an object or file are written such as databases and document and source control systems, for example, although these examples also provide advantages for other applications.

With this technology a mapping of object data to compressed blocks, each including compressed object data, is maintained and stored by the network traffic management apparatus 14 upon receiving an original write request. Subsequent read and write requests requiring access to the object data can be serviced by the network traffic management apparatus 14 based on the mapping and by only retrieving and decompressing, and in the case of some write requests, modifying and recompressing, only the compressed blocks required to service the requests. By accessing fewer compressed blocks in order to service data access requests, resource utilization is reduced and response time for servicing the data access request is reduced for the user of the requesting one of the client computing devices 12.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for accessing data in a compressed file system, comprising:

[obtaining, by a network traffic management apparatus, at least one original write request from a client computing device comprising object data;]

compressing, by [the] *a* network traffic management apparatus, [the] object data *included in an original write request from a client computing device* into a plurality of compressed blocks*, wherein the object data is associated with a file system object*;

generating, by the network traffic management apparatus, a mapping of each of the plurality of compressed blocks to a corresponding portion of the object data, wherein every corresponding portion of the object data is represented in the mapping by [a corresponding unique] *an* object identifier *for the object*, a start offset, and a length *that corresponds to a size of the portion of the object data*; and servicing, by the network traffic management apparatus, at least one subsequent data access request for [at least a portion] *one of the portions* of the object data, the servicing comprising obtaining at least the requested portion of the object data from the mapped one of the plurality of compressed blocks based on the [unique] object identifier, the start offset and the length.

2. The method as set forth in claim 1 wherein the servicing further comprises:

obtaining, by the network traffic management apparatus, the data access request from the client computing device, wherein the data access request comprises a value for a plurality of parameters comprising the object identifier, the start offset, and the length;

identifying, by the network traffic management apparatus, the mapped [at least] one *of the plurality of* compressed [block] *blocks* based at least in part on the mapping and one or more of the data access request parameter values;

retrieving, by the network traffic management apparatus, the identified compressed block;

obtaining, by the network traffic management apparatus, at least a portion of the object data identified by the data access request parameter values; and decompressing, by the network traffic management apparatus, the retrieved compressed block.

3. The method as set forth in claim 2 wherein the data access request is a read request, the method further comprising:

sending, by the network traffic management apparatus, the obtained object data to the requesting client computing device.

4. The method as set forth in claim 2 wherein the data access request is a write request, the write request further comprises *additional* object data, *each of the plurality of compressed blocks includes compressed object data and an empty portion,* and [wherein the compressing, with the network traffic management apparatus, the object data into a plurality of compressed blocks] *the method* further comprises[:

compressing, by the network traffic management apparatus, the object data into a plurality of compressed blocks each including compressed object data and an empty portion, the method further comprising] replacing, by the network traffic management apparatus, the retrieved compressed block with a modified compressed block comprising[.] *a* compressed [write request] *at least a portion of the additional* object data when a size of the modified compressed block is not greater than a size of the retrieved compressed block.

5. The method as set forth in claim 4 further comprising:

modifying, by the network traffic management apparatus, the object data to include *the* at least a portion of the *additional* object data included in the write request;

generating, by the network traffic management apparatus, the modified compressed block; and compressing, by the network traffic management apparatus, the modified object data.

6. The method as set forth in claim 2 wherein the data access request is based on a protocol comprising a common Internet file system (CIFS) protocol, a network file system (NFS) protocol, or a file transfer protocol (FTP).

7. The method as set forth in claim 1 further comprising;

storing, by the network traffic management apparatus, the compressed blocks and the mapping in at least one data storage device.

8. The method as set forth in claim 7, wherein the at least one data storage device comprises tiered storage, a memory of a network traffic management apparatus, or a file server device.

9. A non-transitory computer readable medium having stored thereon instructions for accessing data in a compressed file system comprising machine executable code which when executed by at least one processor, causes the processor to perform steps comprising:

[obtaining at least one original write request from a client computing device comprising object data;]

compressing [the] object data *included in an original write request from a client computing device* into a plurality of compressed blocks, *wherein the object data is associated with a file system object*;

generating a mapping of each of the plurality of compressed blocks to a portion of the object data, wherein every corresponding portion of the object data is represented in the mapping by [a corresponding unique] *an* object identifier *for the object*, a start offset, and a length *that corresponds to a size of the portion of the object data*; and servicing at least one subsequent data access request for one of the portions of the object data, wherein the servicing comprises obtaining at least the requested portion of the object data from the mapped one of the plurality of compressed blocks based on the [unique] object identifier, the start offset and the length.

10. The medium as set forth in claim 9 wherein the servicing further comprises:

obtaining the data access request from the client computing device, wherein the data access request comprises a value for a plurality of parameters comprising the object identifier, the start offset, and the length;

identifying the mapped [at least] one *of the plurality of* compressed block *blocks* based at least in part on the mapping and one or more of the data access request parameter values;

retrieving the identified compressed block[;]

obtaining at least a portion of the object data identified by the data access request parameter values; and decompressing the retrieved compressed block.

11. The medium as set forth in claim 10 wherein the data access request is a read request, the medium further having stored thereon instructions that when executed by the at least one processor cause the processor to perform steps further comprising:

sending the obtained object data to the requesting client computing device.

12. The medium as set forth in claim 10 wherein the data access request is a write request, the write request further comprises *additional* object data, *each of the plurality of compressed blocks includes compressed object data and an empty portion,* and [the compressing the object data into a plurality of compressed blocks further comprises] *the medium further having stored thereon instructions that when executed by the processor further cause the processor to perform one or more steps further comprising*:

[compressing the object data into a plurality of compressed blocks each comprising compressed object data and an empty portion, the medium further comprising] replacing the retrieved compressed block with a modified compressed block comprising *a* compressed [write request] *at least a portion of the additional* object data when a size of the modified compressed block is not greater than a size of the retrieved compressed block.

13. The medium as set forth in claim 12 further having stored thereon instructions that when executed by the processor cause the processor to perform steps further comprising:

modifying the object data to include *the* at least a portion of the *additional* object data included in the write request; [and]

generating the modified compressed block; and compressing the modified object data.

14. The medium as set forth in claim 10 wherein the data access request is based on a protocol comprising a common Internet file system (CIFS) protocol, a network file system (NFS) protocol, or a file transfer protocol (FTP).

15. The medium as set forth in claim 9 further having stored thereon instructions that when executed by the processor cause the processor to perform steps further comprising:

storing, the compressed blocks and the mapping in at least one data storage device.

16. The medium as set forth in claim 15, wherein the at least one data storage device comprises tiered storage, a memory of a network traffic management apparatus, or a file server device.

17. A network traffic management apparatus comprising:

a memory;

configurable logic; and a processor coupled to the memory and the configurable logic, at least one of the configurable logic configured to implement or the processor configured to execute programmed instructions stored in the memory comprising:

[obtaining at least one original write request from a client computing device comprising object data;]

compressing [the] object data *included in an original write request from a client computing device* into a plurality of compressed blocks, *wherein the object data is associated with a file system object*;

generating a mapping of each of the plurality of compressed blocks to a portion of the object data, wherein every corresponding portion of the object data is represented in the mapping by [a corresponding unique] *an* object identifier *for the object*, a start offset, and a length *that corresponds to a size of the portion of the object data*; and servicing at least one subsequent data access request for one of the portions of the object data, wherein the servicing comprises *obtaining* at least the requested portion of the object data from the mapped one of the plurality of compressed blocks based on the [unique] object identifier, the start offset and the length.

18. The apparatus as set forth in claim 17 wherein the servicing further comprises:

obtaining[,] the data access request from the client computing device, wherein the data access request comprises a value for a plurality of parameters comprising the object identifier, the start offset, and the length;

identifying[,] the mapped at least one *of the plurality of* compressed [block] *blocks* based at least in part on the mapping and one or more of the data access request parameter values;

retrieving[,] the identified compressed block[;]

obtaining[,] at least a portion of the object data identified by the data access request parameter values: and decompressing the retrieved compressed block.

19. The apparatus as set forth in claim 18 wherein the data access request is a read request and wherein at least one of the configurable logic is configured to implement or the processor is further configured to execute, programmed instructions stored in the memory further comprising:

sending the obtained object data to the requesting client computing device.

20. The apparatus as set forth in claim 18 wherein the data access request is a write request, the write request further includes *additional* object data, [wherein the compressing the object data into a plurality of compressed blocks further comprises:

compressing the object data into a plurality of compressed blocks each including compressed object data and an empty portion, and wherein] *each of the plurality of compressed blocks includes compressed object data and an empty portion, and* at least one of the configurable logic *is further* configured to implement or the processor [are] *is* further configured to execute programmed instructions stored in the memory further comprising[:]

replacing the retrieved compressed block with a modified compressed block [including] *comprising a* compressed [write request] *at least a portion of the additional* object data when a size of the modified compressed block is not greater than a size of the retrieved compressed block.

21. The apparatus as set forth in claim 20 wherein at least one of the configurable logic is *further* configured to implement or the processor is further configured to execute[,] programmed instructions stored in the memory further comprising:

modifying the object data to include *the* at least a portion of the *additional* object data included in the write request; [and]

generating the modified compressed block; and compressing the modified object data.

22. The apparatus as set forth in claim 18 wherein the data access request is based on a protocol comprising a common Internet file system (CIFS) protocol, a network file system (NFS) protocol, or a file transfer protocol (FTP).

23. The apparatus as set forth in claim 17 wherein the processor is further configured to execute programmed instructions stored in the memory further comprising:

storing, the compressed blocks and the mapping in at least one data storage device.

24. The apparatus as set forth in claim 23, wherein the at least one data storage device comprises tiered storage, a memory of a network traffic management apparatus, or a file server device.

* * * * *